Patented June 25, 1935

2,006,209

UNITED STATES PATENT OFFICE 2,006,209

DULL FINISH COATED PAPER

Donald B. Bradner, Oxford, Ohio, assignor to The Champion Coated Paper Company, Hamilton, Ohio, a corporation of Ohio No Drawing. Application May 25, 1933, Serial No. 672,906

3 Claims. (Cl. 91—68)

In my application Serial No. 590,315, filed February 1, 1932, of which this application is a continuation-in-part, I have described dull finish coated paper and a process of preparing it involving the use of a coating composition containing or comprising uncooked starch.

As is explained in said application, dull finish coated paper is preferred from an artistic standpoint, but as prepared in the past by the use of crystalline mineral pigment of relatively large grain size, it has had certain faults from the standpoint of printing, e. g. it absorbs too much ink and unevenly so that half tone impressions are apt to appear "muddy" and solid colors are apt to lack brilliance and be of uneven tone or "spotty".

Since the process of the present invention is analogous to the process of said application, excepting that pulverized cellulose is substituted for uncooked starch in the coating composition, the process of said application will be briefly described. In accordance therewith an aqueous coating composition is prepared consisting essentially of a suitable adhesive, such as casein or cooked starch, and a pigment consisting wholly or in part of uncooked starch. This coating is applied to the paper and dried and calendered in the customary way and thereafter moistened. The calendering of the coated paper is carried out without regard to the character of the finish, whether dull or glossy, but so as to produce the desired degree of smoothness of the surface. The subsequent moistening of the coating apparently serves to swell the starch grains and to yield a dull finish due to the diffusion of light striking the surface without, however, materially roughening the surface so that the paper has the desirable appearance of a dull finish coated paper and at the same time has the desirable printing qualities of a high finish paper, that is, the finish which existed prior to the moistening.

The coating composition, as stated, consists essentially of an aqueous suspension of pigment at least a part of which is uncooked starch granules in an aqueous solution of a suitable adhesive. In addition to the uncooked starch the coating composition may contain as a part of the pigment component thereof the well known mineral pigments such as satin white, clay, calcium carbonate or the like. The proportions of uncooked starch and mineral pigment may vary with the character of the pigment and the degree of dull finish desired in the product. In general the greater the relative proportion of uncooked starch the greater will be the degree of dullness of the finish and vice versa. The uncooked starch may constitute any desired proportion of the pigment component of the composition, but generally does not exceed 50%.

The application of the coating composition, the smoothing of this coating on the paper stock, the drying and the calendering of the coating are, as stated, all carried out in accordance with known practice.

The subsequent moistening of the coating, followed by drying, if necessary, to develop the dull finish, may be accomplished in a variety of ways, it being necessary only that the moistening be uniform and not excessive. For example, the paper may be passed over a roll carrying a film of water, or it may be contacted with a fine spray or mist, or with wet steam or a humid or moisture-laden atmosphere. If too much water is applied there is a tendency for the paper to cockle and this tendency may be minimized by holding the paper taut during the moistening operation. Under some conditions the application of a special drying operation to the paper after the moistening is unnecessary, e. g. when it has been moistened by means of a humid atmosphere. The dulling effect of the moistening may be regulated by varying the rapidity of the drying operation, since not only the amount of water applied but the time that it is allowed to act, determine the degree of swelling of the starch granules. It is generally preferred to dry the paper by means of a blast of warm air.

The present invention resides essentially in the substitution of pulverized cellulose for uncooked starch in the process of my application Serial No. 590,315, briefly described above. The pulverized cellulose may be obtained from any suitable raw material, such as cotton, sulfite-, kraft-, soda or other chemical wood pulp; rag pulp, etc. Wood itself may be used, but generally is not desirable on account of its color, lignin, resin and other non-cellulosic content which tend to impair the stability of the paper. Bleached sulfite wood pulp is a suitable material from which to obtain the pulverized cellulose.

The present invention is not concerned with the manner in which the pulverized cellulose is prepared, but for completeness it may be said that a suitable product may be obtained by subjecting thoroughly dried fiber to a ball mill operation until it is reduced to an impalpable powder and then screening through a 200-mesh screen.

The pulverized cellulose is incorporated in a suitable coating composition with or without mineral pigment, such as clay, satin white, etc., and a suitable adhesive such as casein, cooked starch, etc., the only requisite in this respect being that the mineral pigment must not be in such proportion with respect to the pulverized cellulose that the effect of the latter in dulling the finish upon subsequent moistening of the coating is completely masked.

The coating composition is applied to the paper, smoothed, dried and supercalendered to the desired smoothness of surface in accordance with the well known practice and then moistened in any of a variety of ways, e. g. by passing the paper over a wet roll or in contact with a spray or mist or steam jets or a humid or moisture-laden atmosphere. In this operation it is desirable to apply the minimum of water to avoid cockling of the paper and the paper preferably is moistened under tension to minimize this tendency. The paper is then dried or not, as required, depending upon the method of moistening used. When using a humid atmosphere, drying generally is unnecessary, but when water is applied by means of a roll or spray, it is generally desirable to dry the paper, e. g. by contacting it with a blast of warm air. The drying serves to prevent excessive swelling of the cellulose fibers. It appears that the production of the dull finish is the result of a swelling of the cellulose fibers probably accompanied by a microscopic roughening of the surface which does not detrimentally affect the printing properties of the paper. However, excessive swelling of the fibers might result in a roughening of the surface which would be detrimental to its printing properties. The moistening of the paper, that is, of the coating, must of course be uniform.

I claim:

1. Process of making dull finish coated paper which comprises coating paper with an aqueous coating composition comprising pulverized cellulose, drying the coating, calendering the coating to the desired surface smoothness and thereafter moistening the coating.

2. Dull finish coated paper, having a supercalendered surface, the coating of which contains pulverized cellulose which has been swelled by moistening in situ.

3. Dull finish coated paper obtained by coating paper with an aqueous coating composition comprising pulverized cellulose, drying and mechanically finishing the coating to the desired smoothness and thereafter moistening the coating, the coated paper product being characterized by smoothness and printing properties corresponding to the mechanical finishing applied and by a dull appearance.

DONALD B. BRADNER.